Figure 1:
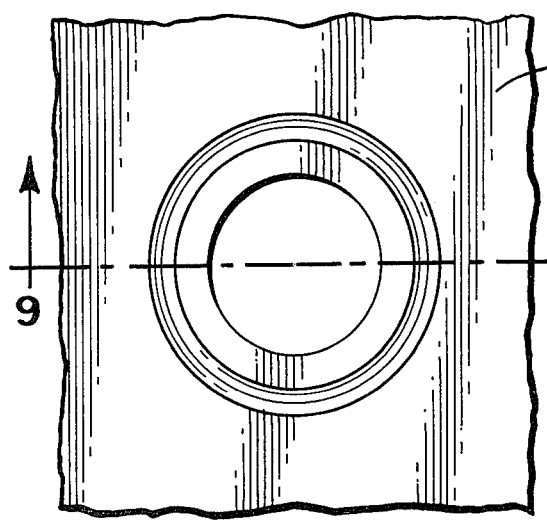
Figure 2:
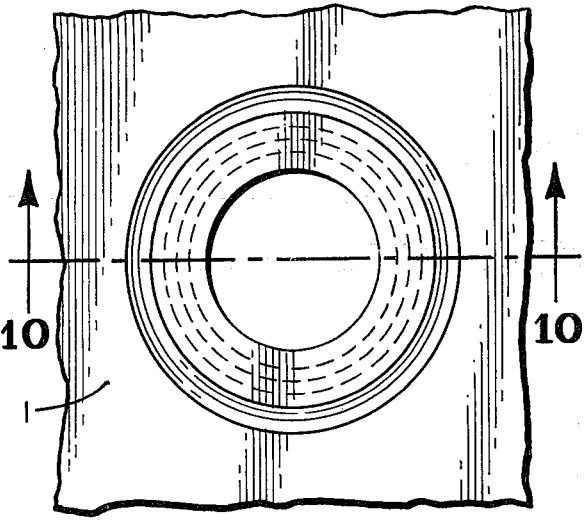
Figure 3:
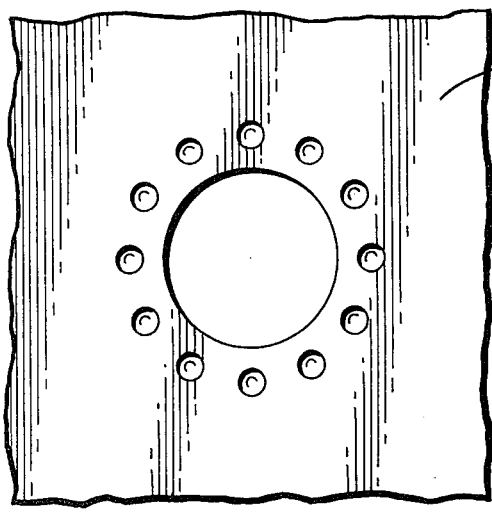
Figure 4:
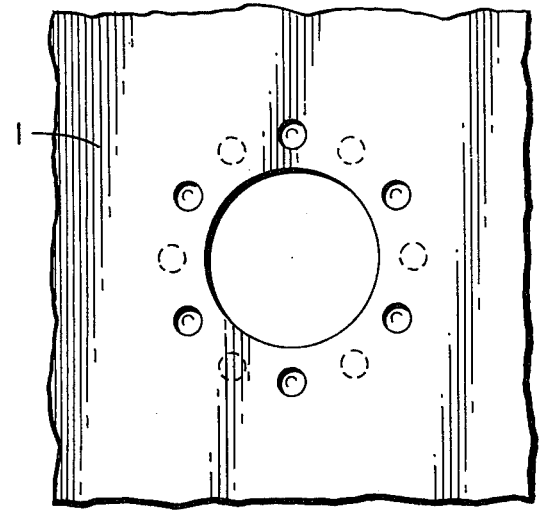

United States Patent [19]

Melin

[11] 4,333,222
[45] Jun. 8, 1982

[54] METHOD OF ELIMINATING CREEP IN SCREW JOINTS OR RIVETED JOINTS

[75] Inventor: Lars E. Melin, Lulea, Sweden

[73] Assignee: Antiphon AB, Sundbyberg, Sweden

[21] Appl. No.: 113,676

[22] Filed: Jan. 21, 1980

[30] Foreign Application Priority Data

Jan. 26, 1979 [SE] Sweden ................. 7900699

[51] Int. Cl.³ .................... B23P 9/00; B23P 19/00
[52] U.S. Cl. .................... 29/445; 29/526 R; 403/408
[58] Field of Search .......... 29/526 R, 445, 469.5; 72/362, 379; 403/405, 408; 156/91, 92

[56] References Cited

U.S. PATENT DOCUMENTS

| | | | |
|---|---|---|---|
| 2,140,672 | 12/1938 | Gray et al. | 29/526 R UX |
| 2,291,887 | 8/1942 | Ellinwood | 29/526 R UX |
| 2,350,827 | 6/1944 | Saulnier | 29/526 R |
| 2,697,873 | 12/1954 | Cooke, Jr. | 29/526 R X |
| 3,682,508 | 8/1972 | Briles | 403/408 X |
| 3,711,138 | 1/1973 | Davis | 403/408 |
| 3,856,424 | 12/1974 | Beck et al. | 403/408 X |
| 4,238,165 | 12/1980 | Wagner | 403/408 X |

FOREIGN PATENT DOCUMENTS 996805 6/1965 United Kingdom .

Primary Examiner—Charlie T. Moon
Attorney, Agent, or Firm—Stevens, Davis, Miller and Mosher

[57] ABSTRACT

A method of eliminating creep in screw joints or riveted joints in a vibration damping so-called laminated sheet, consisting of at least one vibration damping layer of plastic or rubber applied between two metal sheets to a unit, whereupon holes for screws or rivets have been made in the sheet for instance by punching or drilling. The method comprises embossing the laminated sheet from one or both sides around the holes or the prospective holes after or before the formation of the holes, so that the embossing penetrates the damping layer and the sheets are getting a metallic contact with each other, and so that the distance between the sheets is maintained even if the intermediate layer would lose its carrying capacity.

2 Claims, 10 Drawing Figures

METHOD OF ELIMINATING CREEP IN SCREW JOINTS OR RIVETED JOINTS

The present invention relates to a method of eliminating creep in screw joints or riveted joints in a vibration damping so-called laminated sheet.

A laminated sheet consists of a vibration damping layer of plastic, rubber etc. applied between two metal sheets to a unit. During the last years such sheets have got an extensive use due to their extremely good vibration damping qualities.

Often parts made of vibration damping sheet are to be attached to other structural parts by screw joints or riveted joints. Usually this works well. However, if later on such a mounted part is subjected to such a high temperature that the acoustical damping mass will be viscous, flow can result in a unloading of the prestress in the screw or the rivet. As a consequence thereof the part might get loose after some time. For this reason, one is usually retightening screws in such laminated sheets and is avoiding the use of rivets. However, retightening is very cost consuming. Therefore, in many cases one has avoided to use laminated sheets where the flow phenomenon described above has been feared.

During the last few years, one has started to regard noise as an extremely serious environmental problem. Therefore, there has been a great need to be able to mount structural parts of laminated sheet in a safe way by means of screw joints or riveted joints also at such constructions where a high temperature of application could result in flow problems. Especially, this relates to constructions where a great tightness is required, for example at the mounting of oil pans in cars.

According to the present invention one has been able to supply said need and bring about a method of eliminating creep in screw joints or riveted joints in a vibration damping so-called laminated sheet, consisting of at least one vibration damping layer of plastic or rubber applied between two metal sheets to a unit, whereupon holes for screws or rivets have been made in the sheet for instance by punching or drilling. The method comprises embossing the laminated sheet from one or both sides around the holes or the prospective holes after or before the formation of the holes, so that the embossing penetrates the damping layer and the sheets are getting a metallic contact with each other and so that the distance between the sheets is maintained even if the intermediate layer would lose its carrying capacity.

Figure 9:
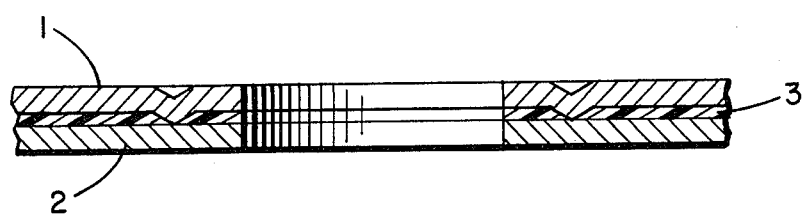
Figure 5:
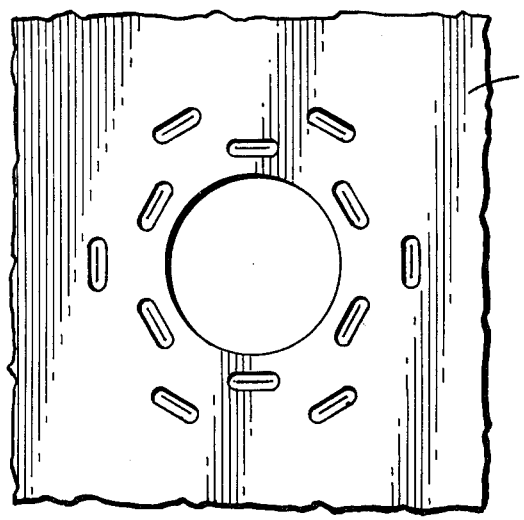
Figure 6:
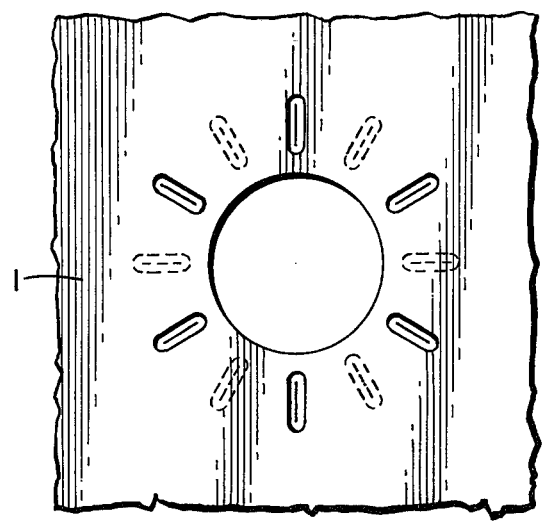
Figure 7:
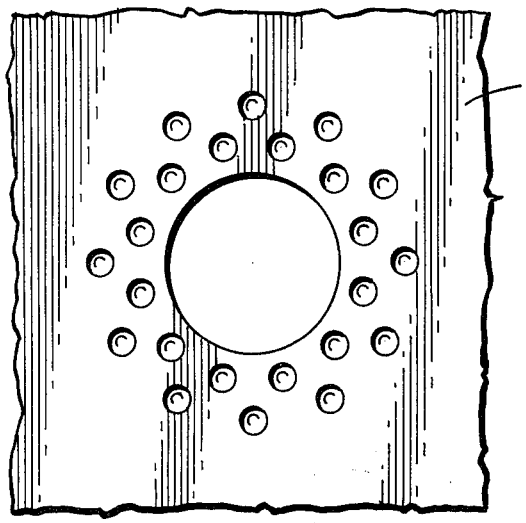
Figure 8:
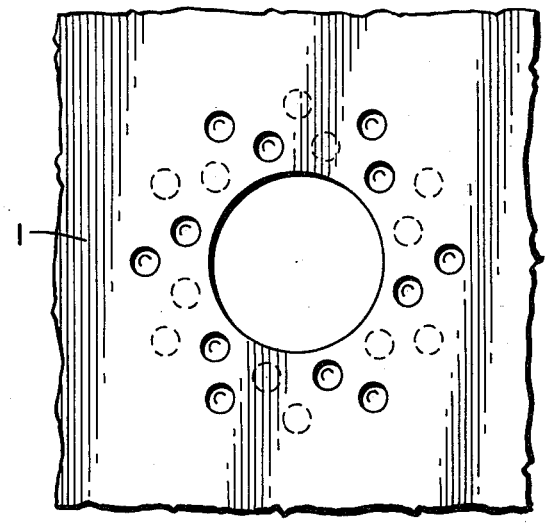
Figure 10:
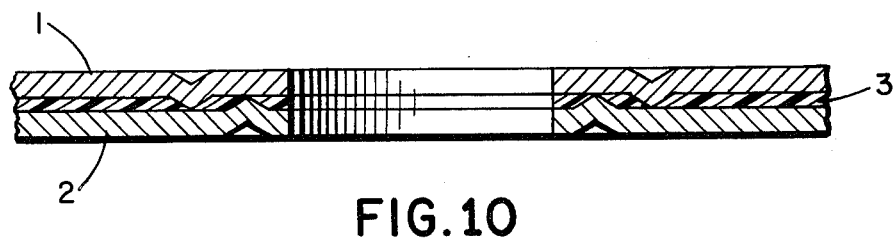

The invention will be explained further in detail in connection with the enclosed Figures, of which FIGS. 1–8 show from above different embodiments of embossing patterns around a hole for screw joints or riveted joints in a laminated sheet, while FIGS. 9 and 10 show two different sections through these embossing patterns.

As shown on FIGS. 9 and 10, the laminated sheet consists of two separate metal sheets 1 and 2 respectively which are joined to a unit by means of a vibration damping plastic layer 3, for example.

On FIGS. 9 and 10 it is clearly shown that the two sheets have a metallic contact with each other after the embossing. As mentioned above, this is a condition for obtaining a safe screw joint or riveted joint according to the invention also when the mounted construction is used at higher temperatures.

The invention is not limited to the embodiments shown, since these can be modified in different ways within the scope of the present invention.

I claim:

1. A method of eliminating creep in screw joints or riveted joints in a vibration damping laminated sheet, comprising at least one vibration damping layer of plastic or rubber between two metal sheets assembled to form a unit, whereupon holes for screws or rivets have been made in the sheet, which comprises embossing the laminated sheet from one or both sides around the holes or the prospective holes after or before the formation of the holes under a pressure which forces protruding portions on an opposite face of said metal sheet or sheets through said damping layer and into contact with the other side of said sheet or sheets, and fastening the metal sheets and damping layer together under compression with a screw or rivet whereby the embossments adjacent said screw or rivet penetrate the damping layer and the sheets are in metallic contact with each other and so that the distance between the sheets is maintained even if the intermediate layer loses its carrying capacity.

2. A method for reducing relative movement between laminates of a laminated article comprising first and second facing metal sheets and an intermediate plastic or rubber vibration damping material joined together into a unit under compression with at least one screw or rivet, said method comprising joining said metal sheets with said damping material therebetween under compression with at least one screw or rivet; and embossing one face of a first metal sheet inwardly towards the intermediate material under a pressure which forces the protruding portion on an opposite face of the metal sheet through a intermediate layer and into contact with the second first metal sheet adjacent to said screw or rivet to fix the metal sheets against relative movement toward each other.

* * * * *

UNITED STATES PATENT AND TRADEMARK OFFICE
CERTIFICATE OF CORRECTION

PATENT NO. : 4,333,222

DATED : June 8, 1982

INVENTOR(S) : Lars E. MELIN

It is certified that error appears in the above-identified patent and that said Letters Patent are hereby corrected as shown below:

Column 2, line 52, after "through", change "a" to --the--

Column 2, line 53, delete "first".

Signed and Sealed this

Nineteenth Day of October 1982

[SEAL]

Attest:

Attesting Officer

GERALD J. MOSSINGHOFF

Commissioner of Patents and Trademarks